United States Patent
Bauer et al.

(10) Patent No.: US 6,394,065 B1
(45) Date of Patent: May 28, 2002

(54) METHOD FOR OPERATING AN INTERNAL COMBUSTION ENGINE

(75) Inventors: Hartmut Bauer, Gerlingen; Dieter Volz, Heilbronn, both of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/720,336
(22) PCT Filed: Jun. 12, 1999
(86) PCT No.: PCT/DE99/01725
§ 371 (c)(1), (2), (4) Date: Dec. 22, 2000
(87) PCT Pub. No.: WO99/67524
PCT Pub. Date: Dec. 29, 1999

(30) Foreign Application Priority Data

Jun. 24, 1998 (DE) ........................................ 198 28 035

(51) Int. Cl.[7] ................................................ F02B 17/00
(52) U.S. Cl. ........................................ 123/295; 701/164
(58) Field of Search ................................ 123/295, 478, 123/490; 701/104

(56) References Cited

U.S. PATENT DOCUMENTS

| | | | |
|---|---|---|---|
| 4,955,339 A | 9/1990 | Sasaki et al. | 123/295 |
| 5,333,583 A | 8/1994 | Matsuura | 123/295 |
| 5,722,362 A | 3/1998 | Takano et al. | 123/295 |
| 5,937,822 A | * 8/1999 | Nakajima | 123/295 |
| 6,062,191 A | * 5/2000 | Ooba | 123/295 |
| 2001/0035153 A1 | * 11/2001 | Russell et al. | 123/295 |

FOREIGN PATENT DOCUMENTS

EP 0 889 218 1/1999

* cited by examiner

Primary Examiner—Erick Solis
(74) Attorney, Agent, or Firm—Walter Ottesen

(57) ABSTRACT

An internal combustion engine (1), especially for a motor vehicle, is described. The engine has an injection valve (8) with which fuel can be injected directly into a combustion chamber (4) either in a first operating mode during a compression phase or in a second operating mode during an induction phase. A control apparatus (16) is provided for switching over between the two modes of operation and for differently controlling (open loop and/or closed loop) the injection duration in the two modes of operation, the injection duration influencing the injected fuel mass. With the control apparatus (16), the injection duration (ti) can be influenced by a function with the switchover from the first operating mode (VH) into the second operating mode (SH).

8 Claims, 12 Drawing Sheets

Number _1 = v| + s| + 1 v| = Number Segments ti + Zdg still VH
(for 4 Cylinder 4 Stroke Engine = 180° KW)
in FIG. 2 for example 4 s| = Number Segments thereafter
Injection/Ignition SH transient $N_1$   Counter from 0 to Number_1

Computation of the Corrective Quantities: for example, for a Linear Trace

Operating Mode Regions, see FIG. 2 total-ti = ti - SH (Standard Computation)*$F_{ti-SH-inst}$ total-ZW = ZW - SH (Standard Computation) + ZW - Delta

METHOD FOR OPERATING AN INTERNAL COMBUSTION ENGINE

FIELD OF THE INVENTION

The invention relates to a method for operating an internal combustion engine, especially of a motor vehicle. In the method, fuel is injected directly into a combustion chamber either in a first operating mode during a compression phase or in a second operating mode during an induction phase. In the method, a switchover is made between the two operating modes and the injection duration, which influences the injected fuel mass, is controlled (open loop and/or closed loop) differently in the two modes of operation. Furthermore, the invention relates to an internal combustion engine, especially for a motor vehicle, having an injection valve with which fuel can be injected directly into a combustion chamber either in a first mode of operation during a compression phase or in a second mode of operation during an induction phase. The engine has a control apparatus for switching between the two operating modes and for controlling (open loop and/or closed loop) differently the injection duration in the two modes of operation. The injection duration influences the injected fuel mass.

BACKGROUND OF THE INVENTION

Systems of this kind for direct injection of fuel into the combustion chamber of an internal combustion engine are generally known. A so-called stratified charge operation as first operating mode and a so-called homogeneous operation as second operating mode are distinguished. The stratified charge operation is used especially for smaller loads; whereas, the homogeneous operation is used for larger loads applied to the engine.

In stratified charge operation, the fuel is injected into the combustion chamber during the compression phase of the engine in such a manner that, at the time point of the ignition, a fuel cloud is located in the direct vicinity of the spark plug. This injection can take place in different ways. Thus, it is possible that the injected fuel cloud is already located at the spark plug during or directly after the injection and is ignited by the spark plug. Likewise, it is possible that the injected fuel cloud is conducted to the spark plug via a charge movement and is only then ignited. In both combustion methods, no uniform fuel distribution is present, instead, a stratified charge is present.

The advantage of the stratified charge operation is that there, with a very small fuel quantity, the applied smaller loads can be taken care of by the engine. Larger loads can, however, not be satisfied with the stratified operation.

In homogeneous operation, which is provided for such larger loads, the fuel is injected during the induction phase of the engine so that a swirling and therefore a distribution of the fuel can still easily take place in the combustion chamber. To this extent, the homogeneous operation corresponds approximately to the operation of internal combustion engines wherein fuel is injected into the intake manifold in the conventional manner. As required, the homogeneous operation can be used also for smaller loads.

In stratified charge operation, the throttle flap in the intake manifold, which leads to the combustion chamber, is opened wide and the combustion is essentially controlled (open loop and/or closed loop) only by the fuel mass to be injected. In homogeneous operation, the throttle flap is opened or closed in dependence upon the requested torque and the fuel mass, which is to be injected, is controlled (open loop and/or closed loop) in dependence upon the inducted air mass.

In both operating modes, that is, in the stratified charge operation and the homogeneous operation, the fuel mass, which is to be injected, is additionally controlled (open loop and/or closed loop) in dependence upon a plurality of additional operating variables with a view to an optimal value with respect to fuel saving, exhaust-gas reduction and the like. The control (open loop and/or closed loop) is then different in the two operating modes.

In the control (open loop and/or closed loop) of direct-injecting internal combustion engines, each of the two operating modes should be considered separately. Likewise, it should be guaranteed that, for the switchover especially from the homogeneous operation into the stratified charge operation, the torque, which is outputted by the engine, remains constant.

SUMMARY OF THE INVENTION

The object of the invention is to provide a method for operating an internal combustion engine which makes possible a constant torque switchover from the first mode of operation into the second mode of operation.

This object is solved in a method of the above kind in accordance with the invention in that the injection duration is influenced by a function when there is the switchover from the first operating mode into the second operating mode. In an engine of the type mentioned initially herein, the object of the invention is solved in that the injection duration can be influenced by a function via the control apparatus with the switchover from the first operating mode into the second operating mode.

In this way, it is possible to compensate the transient performance of the intake manifold pressure of the engine caused by the switchover from the stratified charge operation into the homogeneous operation. With the function, the injection duration can be changed in such a manner that the above-mentioned transient performance is compensated. With the invention, it is achieved that the outputted torque of the engine remains essentially constant when switching over.

It is especially advantageous when the function is determined from a simulation computation or model computation. In this way, a torque, which is essentially constant, is obtained with the switchover from the stratified charge operation into the homogeneous operation.

In an especially advantageous embodiment of the invention, the function is changed in dependence upon one or several operating variables of the engine. In this way, the constancy of the outputted torque can be further improved with the switchover from the stratified charge operation into the homogeneous operation.

It is advantageous when the function runs from a positive start value, which is greater than the value "1" to an end value "1". In this case, it is purposeful when the function is multiplicatively coupled to an injection duration provided for the second mode of operation.

In an advantageous embodiment of the invention, the function is pregiven in a time region wherein an increase of the injection duration, which is really provided for the second operating mode, is required in order to hold the outputted torque of the engine constant. The function is therefore only effective in that time region wherein a correction or compensation of the torque, which is outputted by the engine, is required. Otherwise, the function does not become effective.

The realization of the method of the invention in the form of a control element is of special significance. The control element is provided for a control apparatus of the engine, especially of a motor vehicle. A program is stored on the control element which can be run on a control apparatus, especially on a microprocessor, and is suitable for carrying out the method of the invention. In this case, the invention is therefore realized by a program which is stored on the control element so that this control element, which is provided with the program, defines the invention in the same way as the method for whose execution the program is suitable. As a control element, especially an electric storage medium can be used, such as a read-only-memory.

BRIEF DESCRIPTION OF THE DRAWINGS

The invention will now be explained with reference to the drawings wherein:

FIG. 7a shows a schematic sequence diagram of the control (open loop and/or closed loop) of operating variables of the engine of FIG. 1 from the first operating mode into the second operating mode in accordance with FIGS. 2a and 2b; and, FIG. 7b shows two schematic time diagrams of operating variables of FIG. 7a.

DESCRIPTION OF THE PREFERRED EMBODIMENTS OF THE INVENTION

Figure 1:
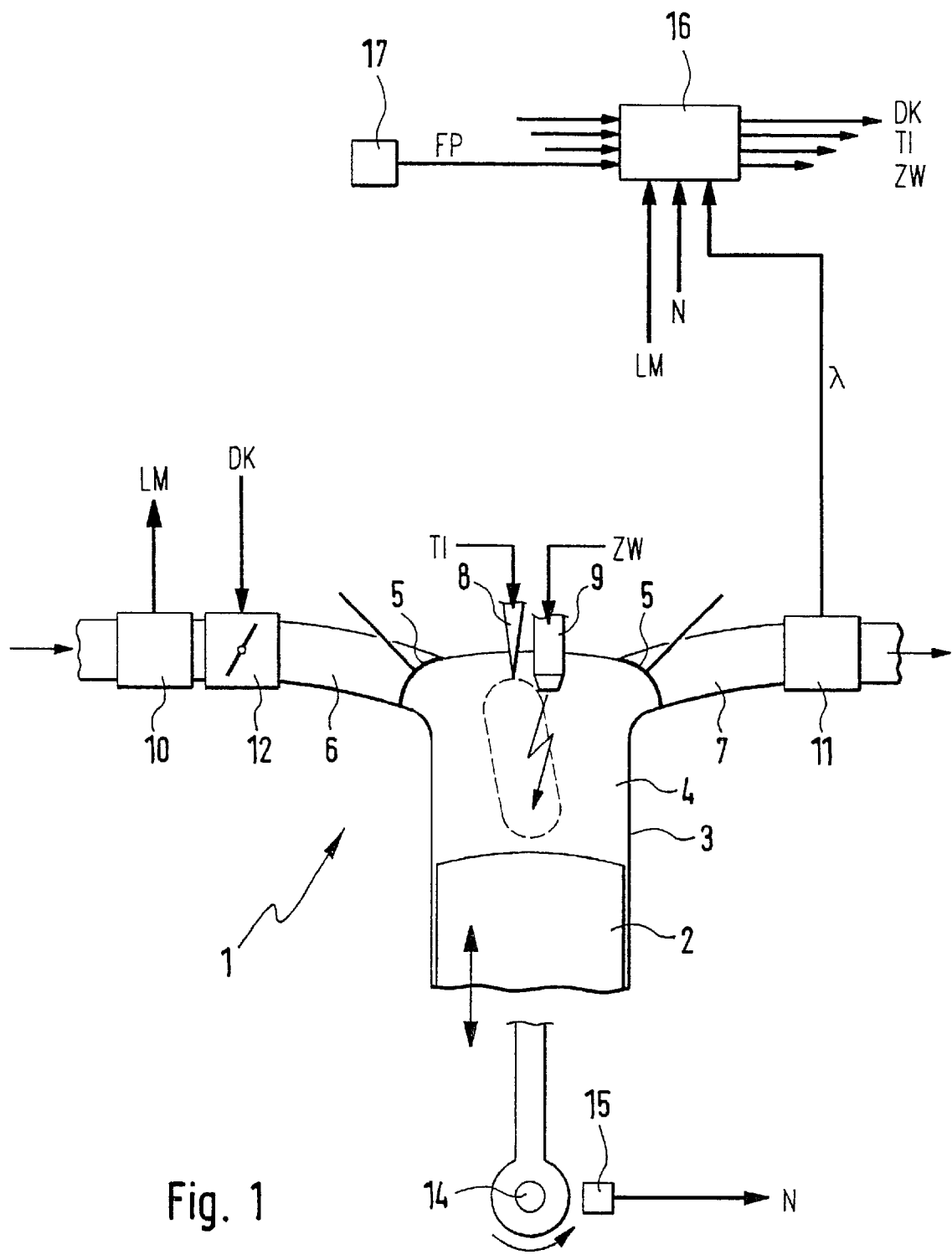
FIG. 1 shows a schematic block circuit diagram of an embodiment of an internal combustion engine of the invention for a motor vehicle.

In FIG. 1, an internal combustion engine 1 is shown wherein a piston 2 is movable back and forth in a cylinder 3. The cylinder 3 is provided with a combustion chamber 4 to which an intake manifold 6 is connected via valve 5 and an exhaust-gas pipe 7 is connected via valve 5. Furthermore, an injection valve 8 and a spark plug 9 are assigned to the combustion chamber 4. The injection valve 8 is driven with a signal TI and the spark plug 9 is driven by a signal ZW.

The intake manifold 6 is provided with an air mass sensor 10 and the exhaust-gas pipe 7 can be provided with a lambda sensor 11. The air mass sensor 10 measures the air mass of the fresh air, which is supplied to the intake manifold 6, and generates a signal LM in dependence thereon. The lambda probe 11 measures the oxygen content of the exhaust gas in the exhaust-gas pipe 7 and generates a signal λ in dependence thereon.

A throttle flap 12 is accommodated in the intake manifold 6 and its rotational position can be adjusted by means of a signal DK.

In a first operating mode, the stratified charge operation of the engine 1, the throttle flap 12 is opened wide. The fuel is injected into the combustion chamber 4 by the injection valve 8 during a compression phase caused by the piston 2 and is injected locally in the direct vicinity of the spark plug 9 as well as at a suitable spacing in time in advance of the ignition time point. Then, the fuel is ignited with the aid of the spark plug 9 so that the piston 2 is driven in the now following work phase by the expansion of the ignited fuel.

In a second operating mode, the homogeneous operation of the engine 1, the throttle flap 12 is partially opened or closed in dependence upon the desired supplied air mass. The fuel is injected into the combustion chamber 4 by the injection valve 8 during an induction phase caused by the piston 2. With the simultaneously drawn-in air, the injected fuel is swirled and thereby essentially uniformly distributed in the combustion chamber 4. Thereafter, the air/fuel mixture is compressed during the compression phase in order to then be ignited by the spark plug 9. The piston 2 is driven by the expansion of the ignited fuel.

In stratified charge operation, as in homogeneous operation, rotational movement is imparted to a crankshaft 14 by the driven piston. The wheels of the vehicle are then driven by this rotational movement. An rpm sensor is assigned to the crankshaft 14 and this sensor generates a signal N in dependence upon the rotational movement of the crankshaft 14.

The fuel mass, which is injected into the combustion chamber 4 by the injection valve 8 in stratified charge operation and in the homogeneous operation, is controlled (open loop and/or closed loop) by a control apparatus 16 especially in view to a reduced consumption of fuel and/or a reduced development of toxic substances. For this purpose, the control apparatus 16 is provided with a microprocessor which has a program stored in a memory medium, especially in a read-only-memory. The program is suitable to carry out of the above-mentioned control (open loop and/or closed loop).

Input signals are applied to the control apparatus 16 which define operating variables of the engine measured by means of sensors. For example, the control apparatus 16 is connected to the air mass sensor 10, the lambda sensor 11 and the rpm sensor 15. Furthermore, the control apparatus 16 is connected to an accelerator pedal sensor 17 which generates a signal FP which indicates the position of an accelerator pedal which is actuated by a driver and thereby indicates the torque requested by the driver. The control apparatus 16 generates output signals with which the performance of the engine can be influenced in correspondence to the desired control (open loop and/or closed loop). For example, the control apparatus 16 is connected to the injection valve 8, the spark plug 9 and the throttle flap 12 and generates the signals TI, ZW and DK required for the control of the injection valve, spark plug and throttle flap.

The method for switching over from a stratified charge operation into a homogeneous operation is described in FIGS. 2 as well as 5 to 7 and is carried out by the control apparatus 16. The blocks shown in FIGS. 5 to 7 define functions of the method which, for example, are realized in the form of software modules or the like in the control apparatus 16.

Figure 2A:
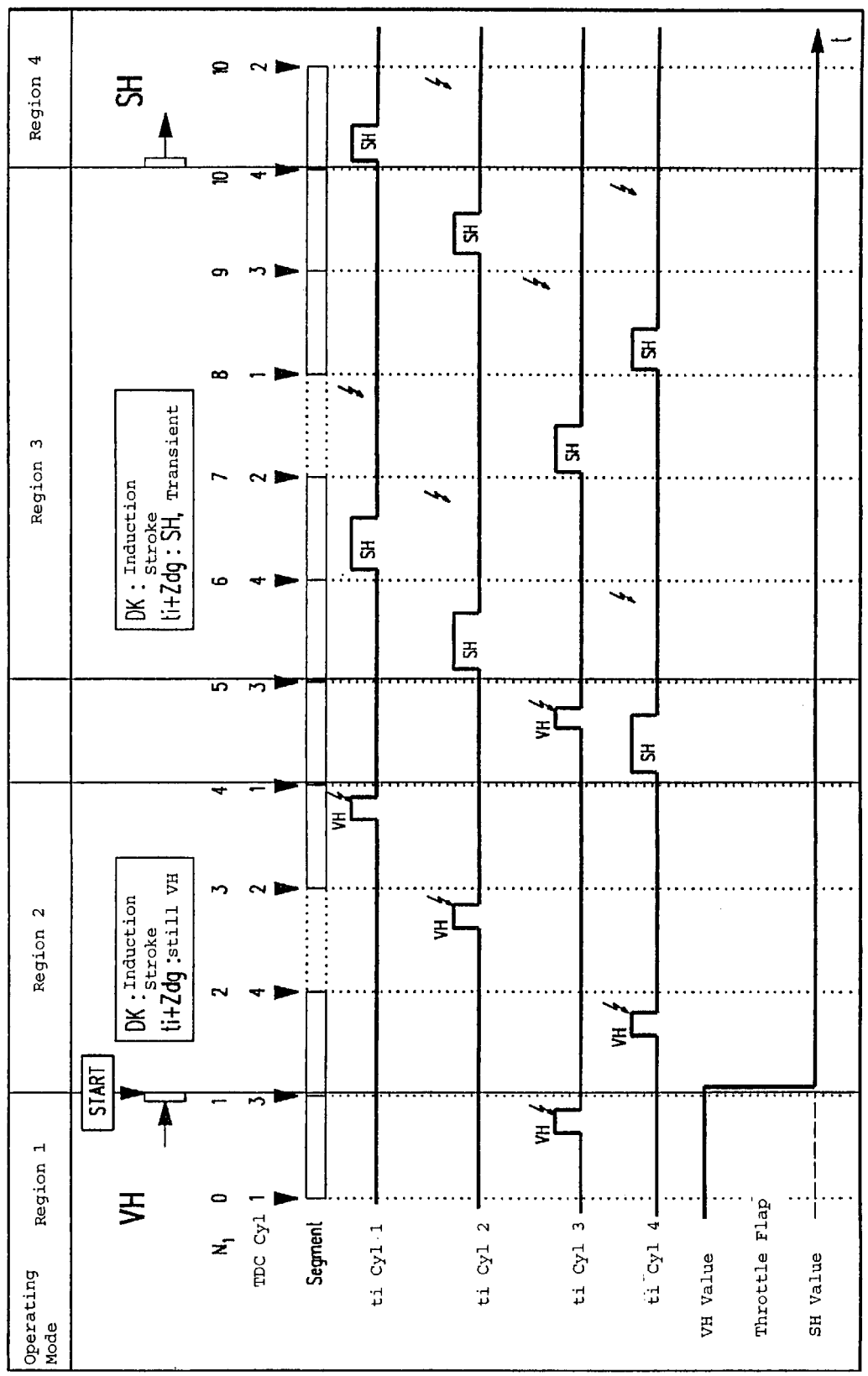
FIG. 2a shows a schematic time diagram of the injections and ignitions of the individual cylinders of the engine of FIG. 1 during the switchover from the first operating mode into the second operating mode.
Figure 2B:
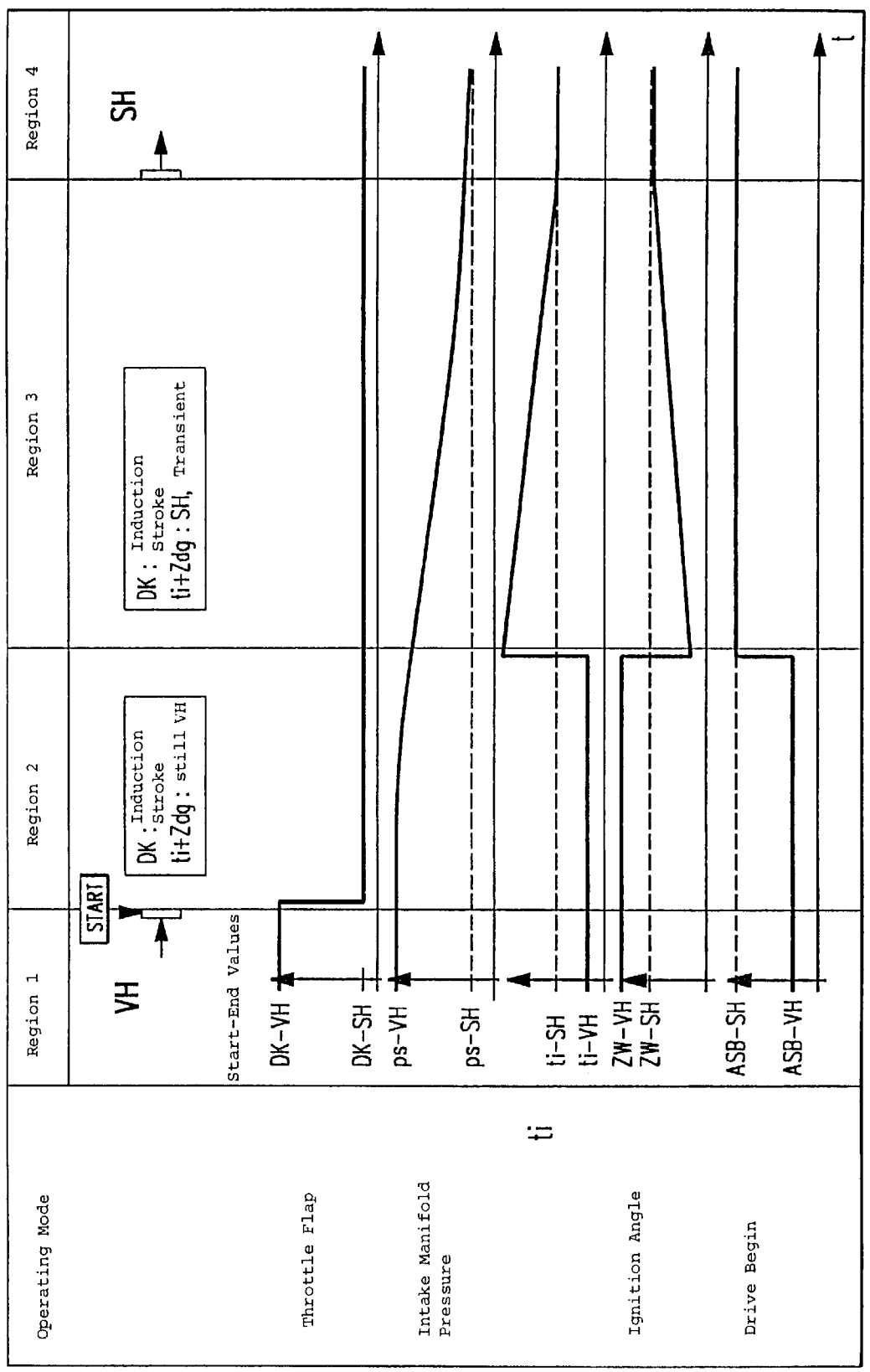
FIG. 2b shows a schematic time diagram of signals for the control (open loop and/or closed loop) of the engine of FIG. 1 for the switchover from the first operating mode into the second operating mode.

In FIGS. 2a and 2b, the switchover from the stratified charge operation into the homogeneous operation is shown in the form of two time diagrams wherein different operating variables of the engine 1 are plotted. In FIGS. 2a and 2b and also in the remaining figures, the stratified charge operation, that is, the first operating mode, is identified as a compression stroke injection VH and the homogeneous operation, that is, the second operating mode, is identified as an induction stroke injection SH.

In FIGS. 2a and 2b, four regions are distinguished. In region 1, the operating variables of the engine 1 are determined and influenced in accordance with a standard VH method. The region 1 defines the normal stratified charge operation. The intake manifold pressure ps shows the standard VH value ps-VH in region 1.

With region 2, the actual switchover from VH to SH begins. With the start of the switchover, the throttle flap DK 12 is changed over from a standard VH value DK-VH to a standard SH value DK-SH. Especially, the throttle flap 12 is moved from its opened state in the stratified charge operation to a throttled state in the homogeneous operation. In region 2, the injection of fuel and the ignition of the fuel are not yet changed. This means that the drive start ASB for the injection, the injection duration ti and the ignition angle ZW are still pregiven in correspondence to the standard VH values ASB-VH, ti-VH, ZW-VH. From FIG. 2b, is it however apparent that, in the region 2, the intake manifold pressure ps slowly reduces because of the throttled position of the throttle flap 12.

A transition from region 2 to region 3 takes place after a pregiven time duration and/or in correspondence to a pregiven simulation computation or model computation and/or in dependence upon the intake manifold pressure ps and/or in dependence upon other operating variables of the engine 1. Generalized, the switchover from the region 2 into the region 3 can be influenced by one or several of the following conditions: time control, angle control (that is, for example, via a number of revolutions), threshold value of an operating variable (for example, intake manifold pressure or air mass), substitute quantities derived from operating variables (for example, indicated mean pressure or indicated torque), rpm threshold value.

While in accordance with FIG. 2a, the fuel is still injected into the combustion chamber 4 during the compression stroke, in region 3, the fuel is injected into the combustion chamber 4 during the suction stroke. Therebetween, a transition segment is located wherein injection into cylinder 3 still takes place during the compression stroke and is ignited; whereas, for the cylinder 4, injection is in the suction stroke and ignition is the next-following compression stroke.

For the transition from region 2 to region 3, the drive start ASB for the injection of fuel is changed in a jump-like manner to a standard SH value ASB-SH. The injection duration ti is increased discontinuously to a value which is greater than a standard SH value ti-SH. The ignition angle ZW is changed discontinuously to a value which is later than a standard SH value ZW-SH. The position of the throttle flap 12 corresponds to the continuously computed standard SH value DK-SH.

In region 3, the injection duration ti and the ignition angle ZW change approximately the same as the intake manifold pressure ps. The injection duration ti and the ignition angle ZW slowly approach the particular standard SH values. This region 3 defines a transient homogeneous operation. When the intake manifold pressure ps and/or other operating variables of the engine 1 have reached the values, which really correspond to the homogeneous operation, that is, ps-SH, then a transition takes place into the region 4. This transition can also take place after a pregiven time duration and/or in correspondence to a simulation computation or model computation.

The region 4 defines the normal homogeneous operation wherein the operating variables of the engine 1 are determined in accordance with standard SH values and are influenced.

Figure 5A:
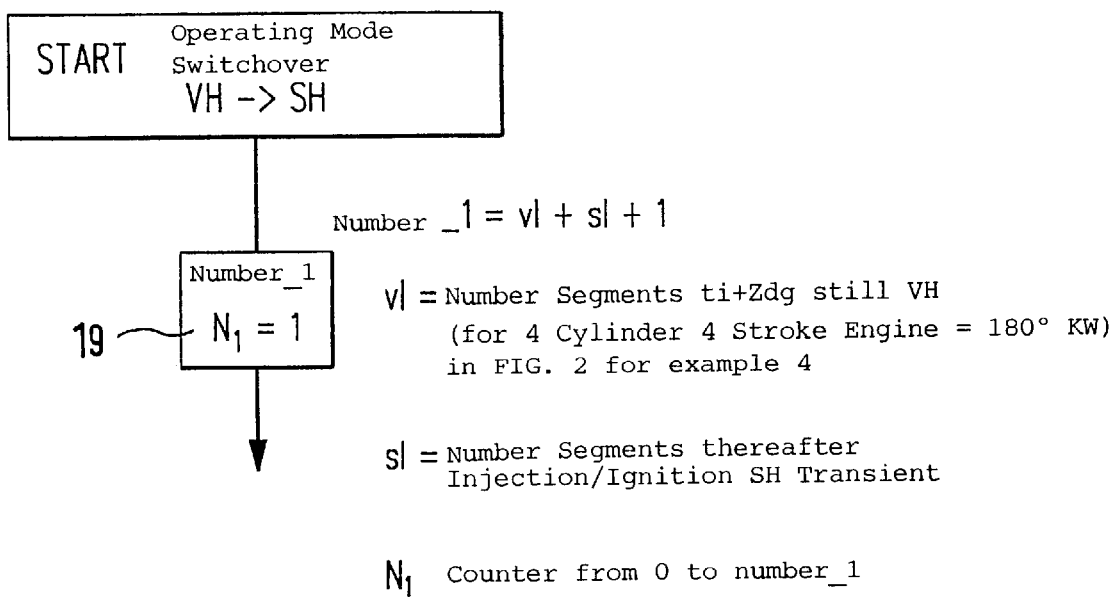
FIG. 5a shows a schematic sequence diagram of the initialization of the control for the switchover of the engine of FIG. 1 from the first operating mode into the second operating mode in accordance with FIGS. 2a and 2b.

In FIG. 5a, a method is initialized with which the individual regions 1 to 4 of FIGS. 2a and 2b are recognized and can be distinguished from each other.

A number_1 is determined in block 19 which is dependent upon the number of segments v1 in which the injection duration ti and the ignition angle ZW in region 2 are still at the standard VH values and which is dependent upon the number of segments si in which the injection duration ti and the ignition angle ZW are transient in region 3 and in dependence upon an additional segment. The following applies: number_1=v1+s1+1.

Then a counter N1 is set to the value N1=1 in block 19. The counter N1 is provided to count up from this value "1" to the value of number_1.

Figure 5B:
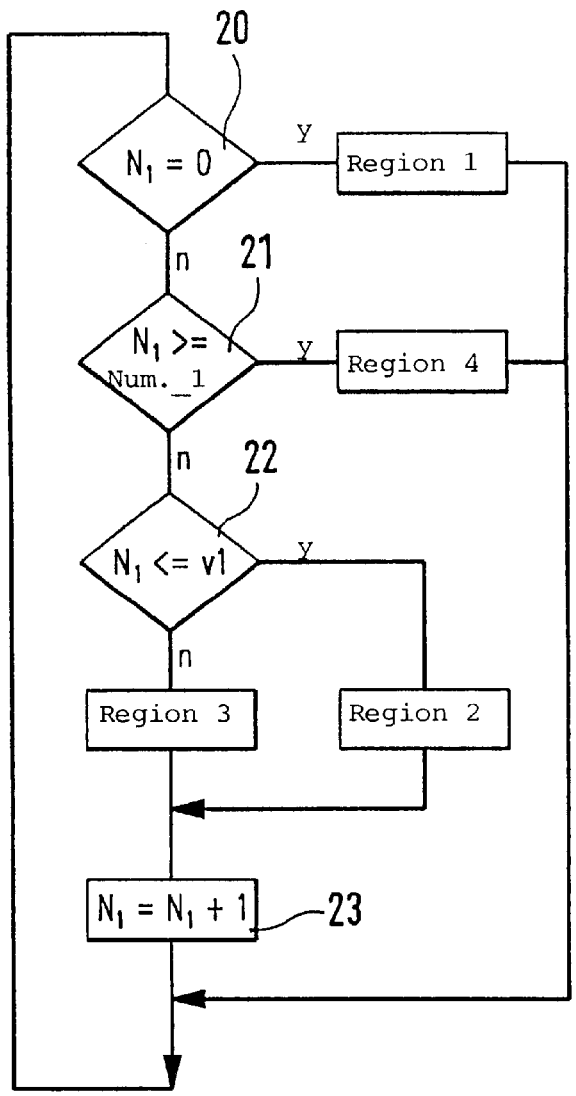
FIG. 5b shows a schematic sequence diagram of the control of the switchover of FIG. 1 from the first operating mode into the second operating mode in accordance with FIGS. 2a and 2b.

In correspondence to block 20 of FIG. 5b, the engine 1 is operated in the region 1, that is, in the stratified charge operation, as long as N1=0. The counter N1 is not incremented. Only when the counter N1 is set to the value N1=1 by the block 19 of FIG. 5a is the next block 21 reached.

If N1 is greater or equal to number_1 in correspondence to block 21, then the engine 1 is operated in correspondence to region 4 and therefore in the homogeneous operation. The counter N1 is not incremented. Only when the counter N1 is again set to N1=0, for example, during the execution of a later stratified charge operation, is the region 1 reached again.

If N1 is neither "0" nor greater than the number_1, then a check is made in block 22 as to whether N1 is less or equal to v1. If this is the case, then the engine 1 is operated in correspondence to region 2, that is, with a throttled throttle flap 12 but otherwise at standard VH values. If, in contrast, this is not the case, then the engine 1 is operated in correspondence to region 3, that is, in the non-steady state homogeneous operation. In both cases, the method is continued with block 23.

In block 23, the counter N1 is incremented after running through a segment or a work cycle of the engine 1. The described method of FIG. 5b is thereafter again run through for the new value of the counter N1. This is continued until the counter N1=number_1 is reached. Then, a transition takes place to region 4 as described.

Overall, it is possible, in accordance with the method and with FIGS. 5a and 5b, to recognize and to distinguish the individual regions or transition segments of FIGS. 2a and 2b from each other. Corresponding to the described method, there is a switching into the individual regions in dependence upon the segments or work cycles of the engine 1 and the engine 1 is influenced in correspondence to the individual regions.

Figure 6:
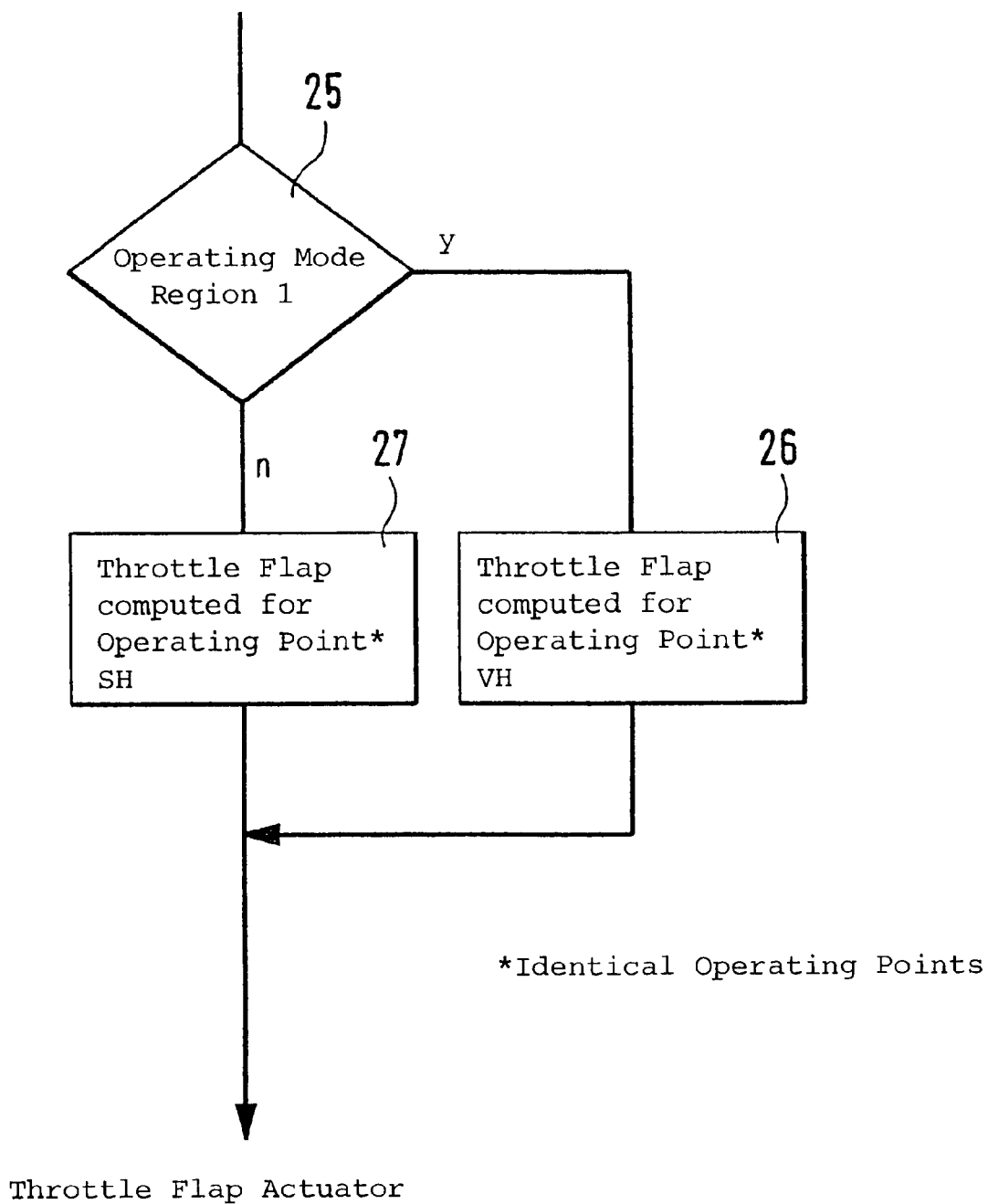
FIG. 6 shows a schematic sequence diagram of the control of the throttle flap of the engine of FIG. 1 from the first operating mode into the second operating mode in accordance with FIGS. 2a and 2b.

In FIG. 6, a determination is made in block 25 as to whether region 1 is present. This takes place on the basis of the method of FIGS. 5a and 5b. If region 1 is present, then the position of the throttle flap 12 for a specific operating point in the stratified charge operation is determined and adjusted in block 26, that is, in the compression stroke injection VH. If this however is not the case, then in block 27, the position of the throttle flap 12 is determined and adjusted for the same specific operating point in the homogeneous operation, that is, in the suction stroke injection SH.

This corresponds to the adjustment of the throttle flap 12 in the region 1 to the standard VH value DK-VH as described with respect to FIGS. 2a and 2b. The standard VH value DK-VH defines a position of the throttle flap 12 wherein the latter is essentially open; whereas, in the other regions 2 to 4, the throttle flap 12 is adjusted to the above-mentioned standard SH value DK-SH, which defines the throttled position.

Figure 7A:
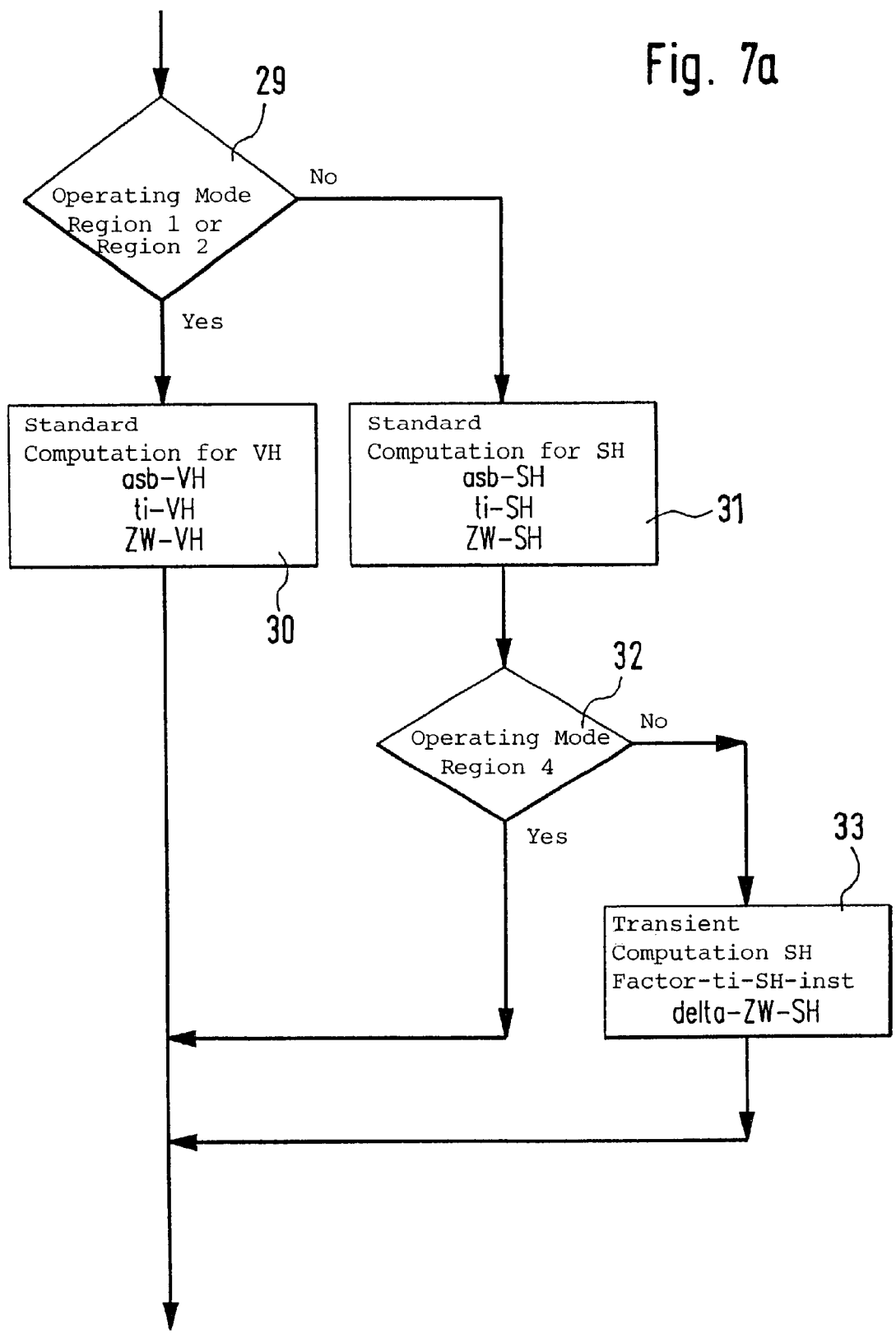

In FIG. 7a, a determination is made in block 29 in accordance with the method of FIGS. 5a and 5b as to whether the region 1 or the region 2 is present. If this is the case, then in block 30, the standard VH values are determined and the engine 1 is correspondingly influenced. The standard VH values are the standard VH values already explained with respect to FIGS. 2a and 2b and are for the drive start ASB-VH, the injection duration ti-VH and the ignition angle ZW-VH.

If neither the region 1 nor the region 2 is present, then the standard SH values are determined in block 31. These standard SH values are then standard SH values (which are already explained in FIGS. 2a and 2b) for the drive start ASB-SH. Furthermore, the standard SH values are the injection duration ti-SH and the ignition angle ZW-SH.

In a next block 32, a check is made as to whether region 4 is present. If this is the case, then the region 4 is present. In this region 4, the operating variables of the engine 1 are adjusted in correspondence to the homogeneous operation, that is, the standard values ti-SH and ZW-SH are used directly.

If region 4 is however not present, then the non-steady state homogeneous operation of the region 3 of the engine 1 is present and a non-steady state computation is carried out in block 33.

Figure 7B:
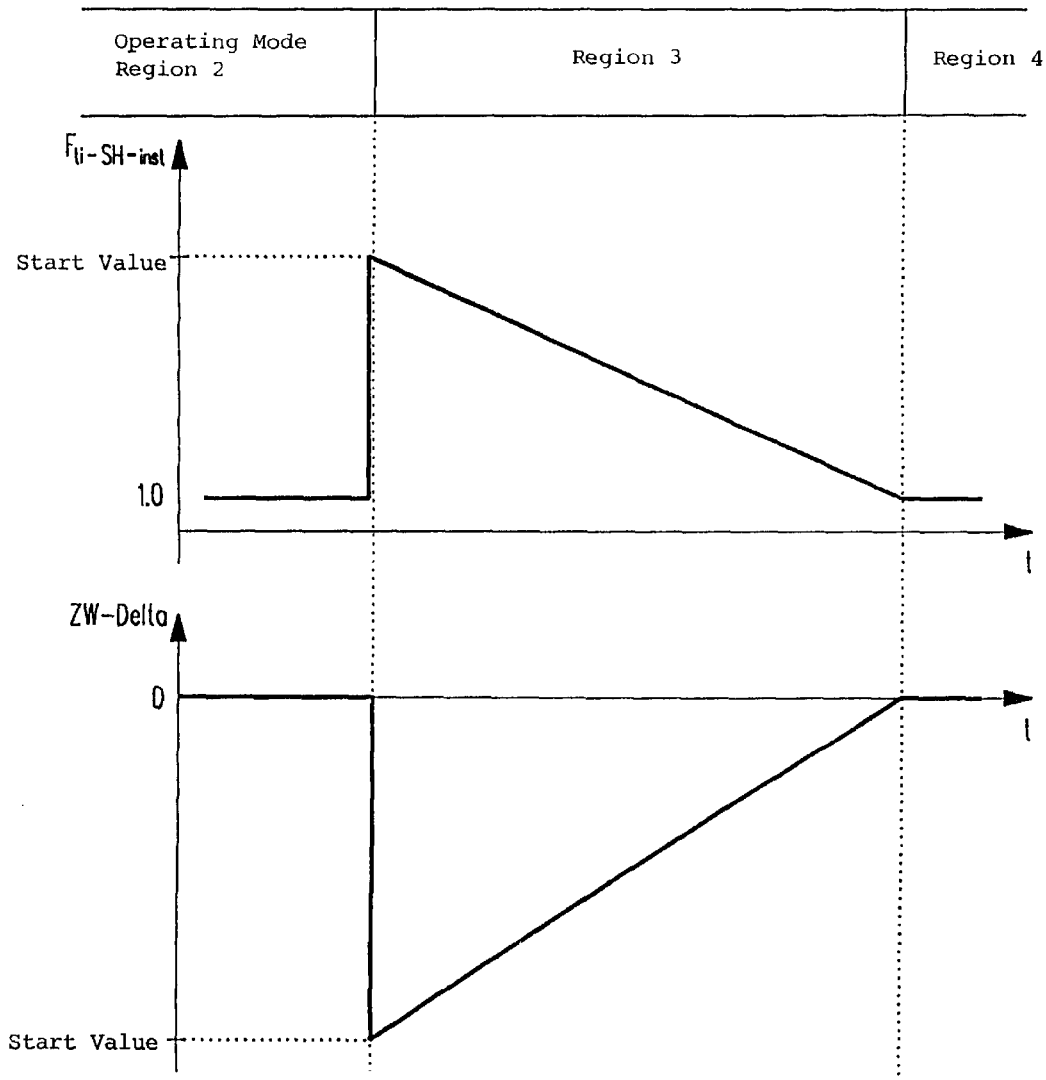

In this non-steady state computation, a function $F_{ti\text{-}SH\text{-}inst}$ and a function ZW-delta are determined in accordance with FIG. 7b. The trace of all functions can be linear as shown or also can be curved. Both functions start at the transition from the region 2 to the region 3 from a start value which is greater than the value "1". In the function $F_{ti\text{-}SH\text{-}inst}$, the start value is positive, whereas, for the function ZW-delta, the start value is negative. In the function $F_{ti\text{-}SH\text{-}inst}$, the function ends at the transition from the region 3 to the region 4 with the value "1"; whereas, the function ZW-delta ends with the value "0".

The function $F_{ti\text{-}SH\text{-}inst}$ and/or the function ZW-delta can be fixedly pregiven. The functions have been or can be determined by previous or simultaneous simulation computations and/or models computations. Alternatively, or in addition, it is possible that the function $F_{ti\text{-}SH\text{-}inst}$ and/or the function ZW-delta are determined in dependence upon one or several operating variables of the engine 1 or are at least dependent therefrom.

The function $F_{ti\text{-}SH\text{-}inst}$ and/or the function ZW-delta are multiplicatively and/or additively coupled to the particular corresponding standard SH values.

The injection duration ti in region 3 thereby results in:

ti-total=ti-SH*$F_{ti\text{-}SH\text{-}inst}$.

The ignition angle ZW in region 3 results as:

ZW-total=ZW-SH+ZW-delta.

In this way, the trace of the injection duration ti in region 3 shown in FIG. 2b results from the standard SH value ti-SH. Correspondingly, the trace of the ignition angle ZW in region 3 shown in FIG. 2b results correspondingly from the standard SH value ZW-SH.

An increase of the outputted torque, which is generated by the engine, is achieved from the increase of the injection duration ti shown in FIG. 2b and resulting from the function $F_{ti\text{-}SH\text{-}inst}$. This increase of the fuel mass is necessary in order to achieve a defined homogeneous ignitable mixture. By retarding the ignition, it is achieved that, in total, an essentially constant torque is maintained with the switchover from the stratified charge operation VH into the homogeneous operation SH.

Figure 3A:
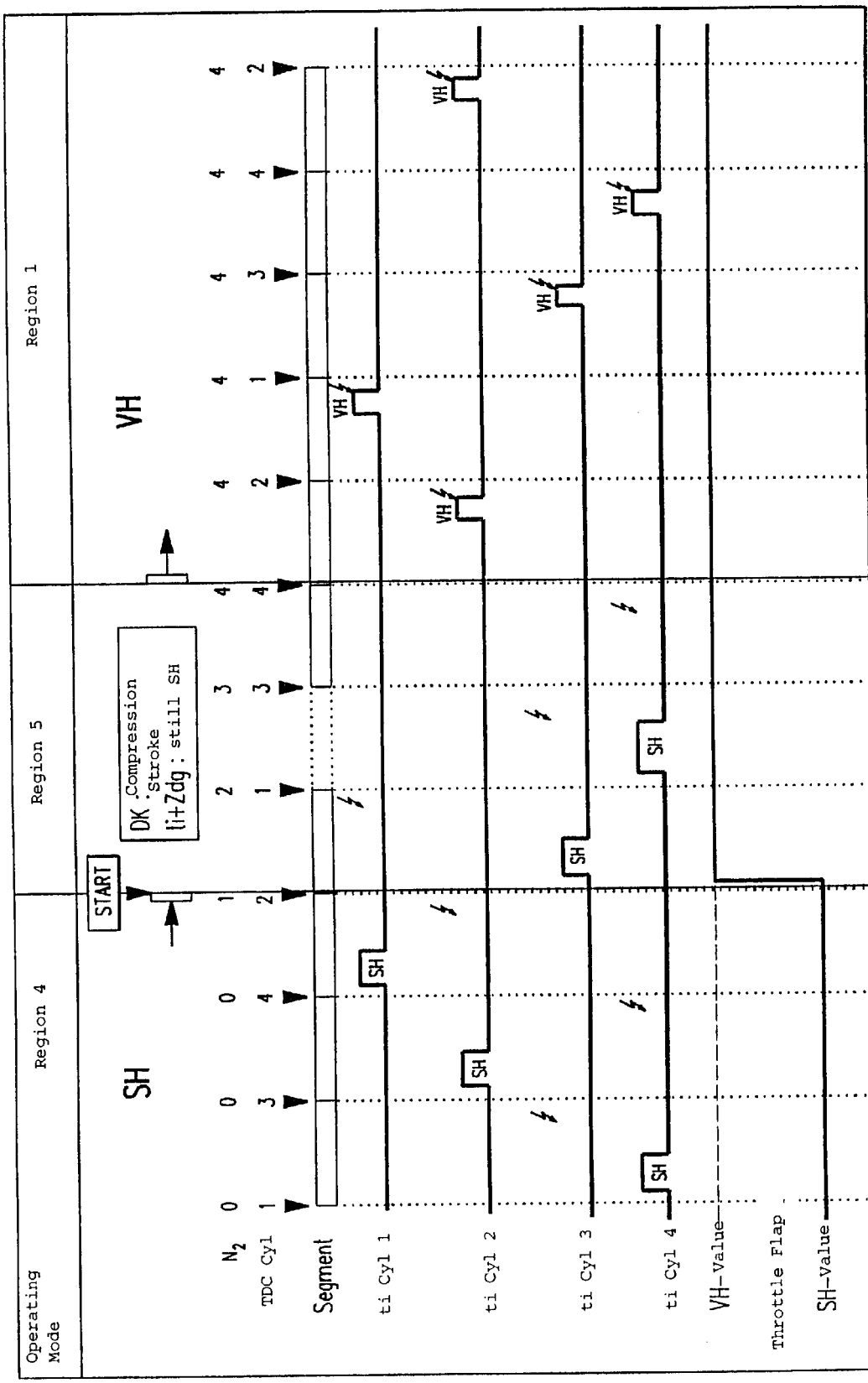
FIG. 3a shows a schematic time diagram of the injections and ignitions of the individual cylinders of the engine of FIG. 1 for a first alternative of the switchover from the second operating mode into the first operating mode.
Figure 3B:
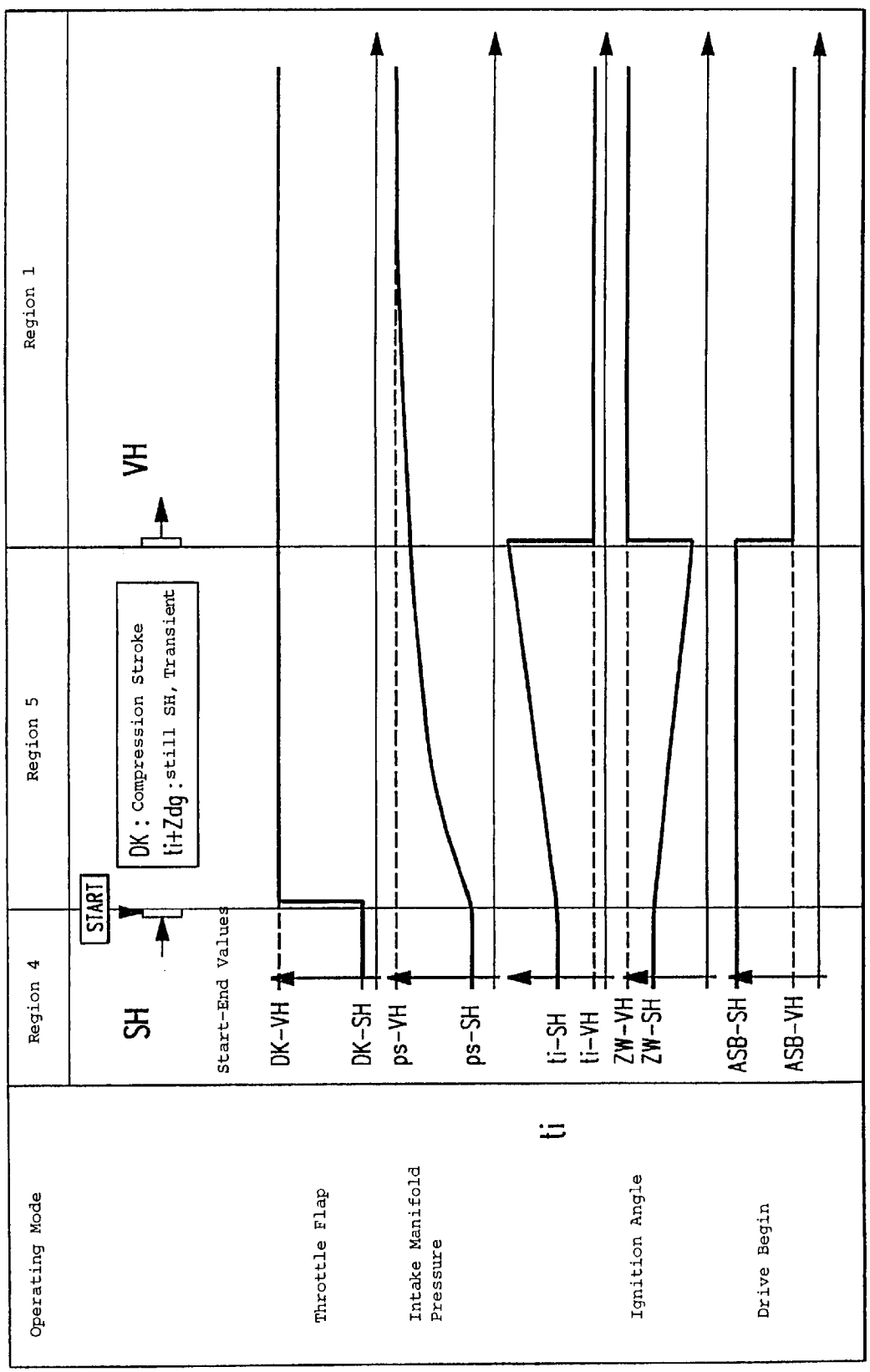
FIG. 3b shows a schematic time diagram of signals for the control (open loop and/or closed loop) of the engine of FIG. 1 for a first alternative of the switchover from the second operating mode into the first operating mode.
Figure 4A:
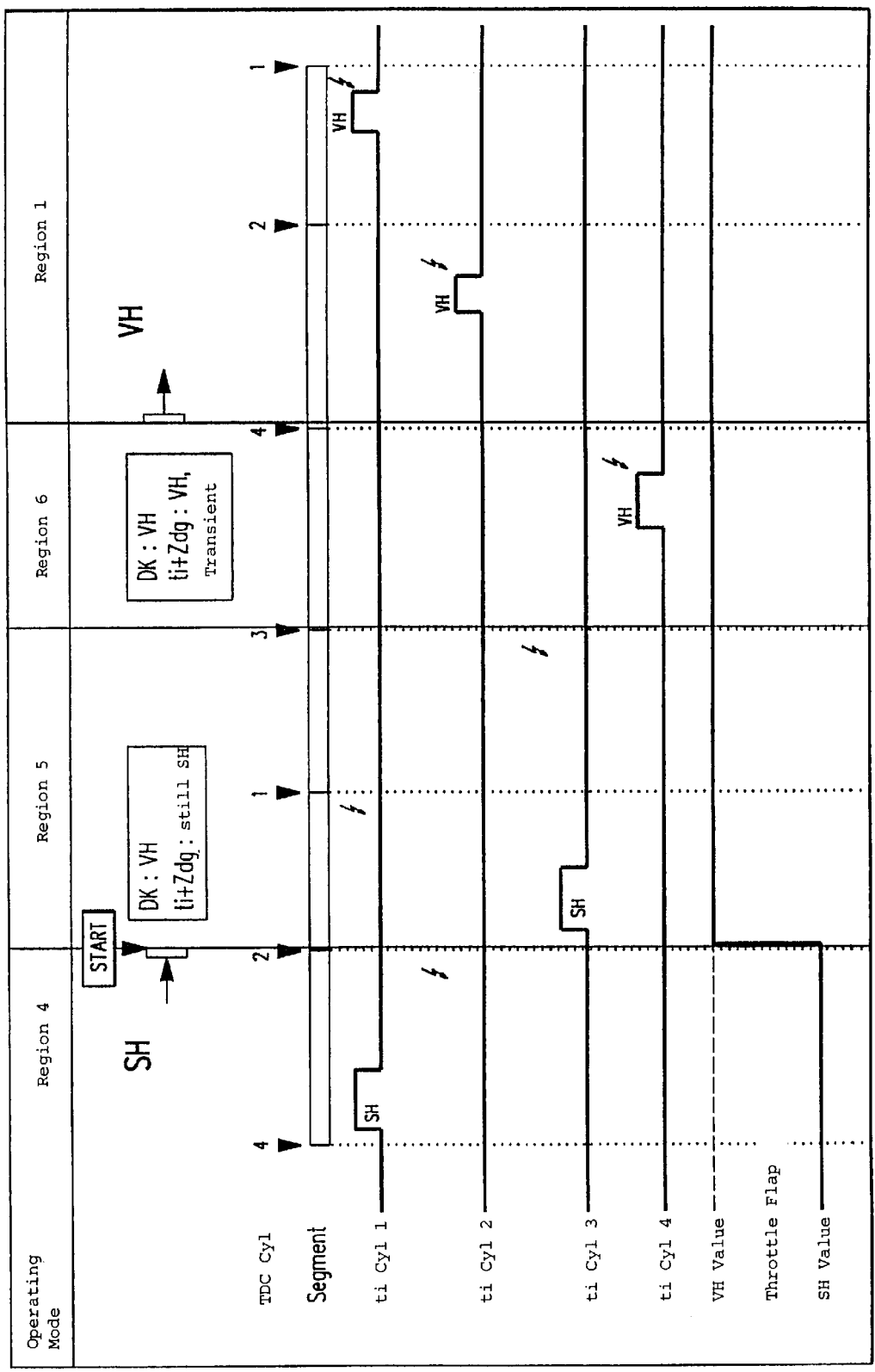
FIG. 4a shows a schematic time diagram of the injections and ignitions of the individual cylinders of the engine of FIG. 1 for a second alternative of the switchover from the second operating mode into the first operating mode.
Figure 4B:
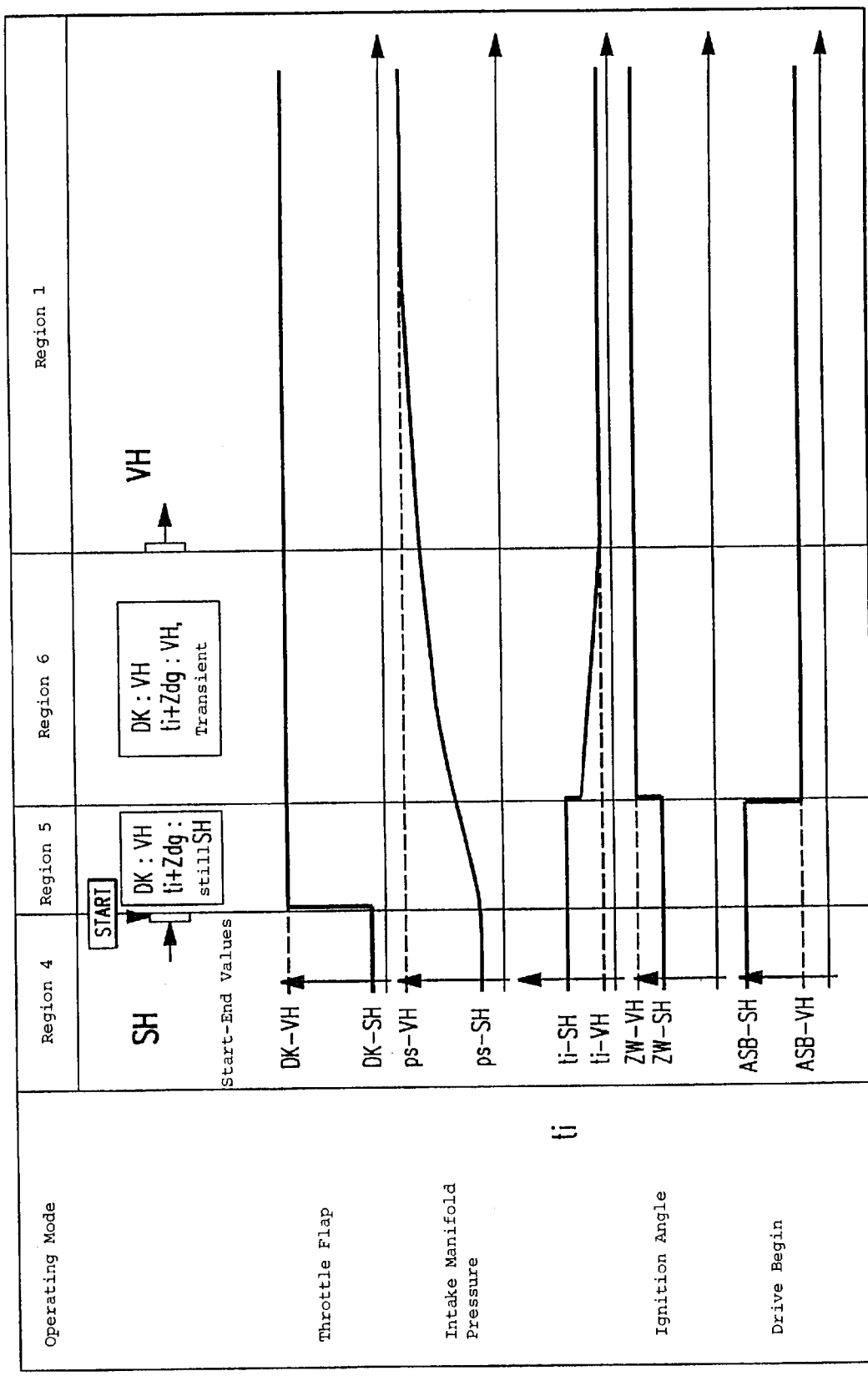
FIG. 4b shows a schematic time diagram of signals for the control (open loop and/or closed loop) of the engine of FIG. 1 for a second alternative of the switchover from the second operating mode into the first operating mode.

In FIGS. 3a and 3b as well as in FIGS. 4a and 4b, the switchover is shown from the homogeneous operation into the stratified charge operation in the form of two respective time diagrams wherein different operating values of the engine 1 are plotted. FIGS. 3a and 3b as well as FIGS. 4a and 4b correspond in their configuration essentially to FIGS. 2a and 2b to which reference is made up.

In FIGS. 3a and 3b as well as in FIGS. 4a and 4b, two alternatives of a switchover are shown from the homogeneous operation into the stratified charge operation, that is, from SH to VH. In the first alternative according to FIGS. 3a and 3b, the region 4 defines the homogeneous operation SH and the region 1 defines the stratified charge operation VH; whereas, in the region 5 disposed therebetween, the switchover takes place. In the second alternative of FIGS. 4a and 4b, the region 4 likewise defines the homogeneous operation SH and the region 1 the stratified charge operation VH; whereas, the two regions 5 and 6 therebetween serve for the switchover.

In these two alternatives, the engine 1 is operated in the region 4 with standard SH values for the homogeneous operation. Correspondingly, the engine 1 is operated in both alternatives in the region 1 with the standard VH values for the stratified charge operation.

In both alternatives, the switchover starts with the end of region 4 and ends with the switchover to the start of region 1. In both alternatives, the throttle flap 12 is converted in a jump-like manner from the standard value DK-SH to the standard value DK-VH at the end of region 4, that is, with the end of the homogeneous operation.

In the first alternative of FIGS. 3a and 3b, the drive start for the injection of fuel into the combustion chamber 4 is changed over in a jump-like manner at the start of region 1 from the standard value ASB-SH to the standard ASB-VH. During region 5, the ignition angle ZW is shifted in the retard direction from the standard value ZW-SH with time in order to then change in a jump-like manner to the standard value ZW-VH in the transition to the region 1. The injection duration ti increases starting from the standard value ti-SH during the region 5 with time in order to reduce in a jump-like manner to the standard value ti-VH in the transition to region 1.

In the second alternative of FIGS. 4a and 4b, the drive start for the injection of fuel during transition from the region S to the region 6 is reduced in a jump-like manner from the standard value ASB-SH to the standard values ASB-VH. The ignition angle ZW and the injection duration ti are still held during region 5 to the standard values ZW-SH and ti-SH. The ignition angle is changed from the standard value ZW-SH in a jump-like manner to the standard ZW-VH with the transition from the region 5 to the region 6. The injection duration ti is reduced first in a jump-like manner in the transition from the region 5 to the region 6 to a value which is less than the standard ti-SH which, however, is still greater than the standard value ti-VH. Then, the injection duration is reduced from this value with time within the region 6 to the standard value ti-VH.

With the method shown in FIGS. 3a and 3b as well as FIGS. 4a and 4b, a switchover from the homogeneous operation into the stratified charge operation is reached wherein the torque, which is outputted and generated by the engine 1, remains essentially constant.

What is claimed is:

1. A method for operating an internal combustion engine including an engine of a motor vehicle, the method comprising the steps of:

injecting fuel directly into the combustion chamber either in a first operating mode (VH) during a compression phase or in a second operating mode (SH) during an induction phase;

switching over between the two operating modes (VH, SH);

controlling (open loop and/or closed loop) the injection duration (ti), which influences the injected fuel mass, differently in the two operating modes (VH, SH); and, when switching from the first operating mode (VH) into the second operating mode (SH), influencing the injection duration (ti) via a function ($F_{ti-SH-inst}$) which runs from a positive start value, which is greater than 1, to an end value 1.

2. The method of claim 1, comprising the further step of determining the function ($F_{ti-SH-inst}$) from a simulation computation or a model computation.

3. The method of claim 1, comprising the further step of changing the function ($F_{ti-SH-inst}$) in dependence on one or several operating variables of the engine.

4. The method of claim 1, wherein the function ($F_{ti-SH-inst}$) is coupled multiplicatively with an injection duration (ti-SH) provided for the second operating mode (SH).

5. The method of claim 1, wherein the function ($F_{ti-SH-inst}$) is pregiven in a time region (region 3) wherein an increase of the injection duration (ti-SH) is required in order to hold the outputted torque of the engine constant, the time duration (ti-SH) being provided for the second operating mode (SH).

6. A program comprising:

a suitability for carrying out a method for operating an internal combustion engine including an engine of a motor vehicle when the program is executed on a computing apparatus and the method including the steps of:

injecting fuel directly into the combustion chamber either in a first operating mode (VH) during a compression phase or in a second operating mode (SH) during an induction phase;

switching over between the two operating modes (VH, SH);

controlling (open loop and/or closed loop) the injection duration (ti), which influences the injected fuel mass, differently in the two operating modes (VH, SH); and, when switching from the first operating mode (VH) into the second operating mode (SH), influencing the injection duration (ti) via a function ($F_{ti-SH-inst}$) which runs from a positive start value, which is greater than 1, to an end value 1.

7. The program of claim 6, wherein said program is stored in a memory.

8. An internal combustion engine including an engine for a motor vehicle, the engine comprising:

an injection valve with which fuel is injected directly into a combustion chamber either in a first operating mode (VH) during a compression phase or in a second operating mode (SH) during an induction phase;

a control apparatus for switching over between the two modes of operation (VH, SH);

said control apparatus including means for controlling (open loop and/or closed loop) the injection duration (ti) which influences the injected fuel mass in the two operating modes (VH, SH); and, said control apparatus further including means for influencing the injection duration (ti) via a function ($F_{ti-SH-inst}$) when switching over from the first operating mode (VH) into the second operating mode (SH) and said function running from a positive start value, which is greater than 1, to an end value 1.

* * * * *